United States Patent
Huang et al.

(10) Patent No.: US 8,228,687 B2
(45) Date of Patent: Jul. 24, 2012

(54) ELECTRONIC DEVICE WITH MOUNTING MECHANISM

(75) Inventors: Ri-Dong Huang, Shenzhen (CN);
Yang-Ming Lin, Shenzhen (CN);
Hsuan-Tsung Chen, Taipei Hsien (TW);
Guang-Yao Lee, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 263 days.

(21) Appl. No.: 12/729,191

(22) Filed: Mar. 22, 2010

(65) Prior Publication Data
US 2011/0103035 A1    May 5, 2011

(30) Foreign Application Priority Data
Nov. 4, 2009   (CN) .......................... 2009 1 0309286

(51) Int. Cl.
*H05K 7/02* (2006.01)
*H05K 7/04* (2006.01)

(52) U.S. Cl. .................... 361/810; 361/807; 361/756
(58) Field of Classification Search .......... 361/801–803, 361/807, 810, 756, 825, 679, 685, 686, 725, 361/731
See application file for complete search history.

(56) References Cited

U.S. PATENT DOCUMENTS

| | | | | |
|---|---|---|---|---|
| 5,921,644 A * | 7/1999 | Brunel et al. | ............... | 312/223.2 |
| 6,252,765 B1 * | 6/2001 | Balzaretti et al. | ........ | 361/679.42 |
| 6,728,109 B1 * | 4/2004 | Wu | ............................... | 361/747 |
| 7,180,753 B2 * | 2/2007 | Kerrigan et al. | ............... | 361/797 |
| 7,430,115 B2 * | 9/2008 | Liu et al. | .................. | 361/679.33 |
| 7,561,441 B1 * | 7/2009 | Chang | ........................... | 361/801 |
| 7,575,203 B2 * | 8/2009 | Lan et al. | ..................... | 248/27.1 |

* cited by examiner

*Primary Examiner* — Hung S Bui
(74) *Attorney, Agent, or Firm* — Altis Law Group, Inc.

(57) ABSTRACT

An electronic device includes an electronic component, a bracket, a driving member, and a securing member. The bracket encloses the electronic component. The driving member and the securing member are mounted on the bracket. The driving member is operated along a first direction to force the securing member move along a second direction and engage with the bracket and the electronic component to assemble the bracket and the electronic component together.

20 Claims, 4 Drawing Sheets

ELECTRONIC DEVICE WITH MOUNTING MECHANISM

BACKGROUND

1. Technical Field

The present disclosure relates to electronic devices and, more particularly, to an electronic device which includes a mounting mechanism for facilitating assembly or disassembly of an electronic component of the electronic device.

2. Description of Related Art

Generally, an optical disk drive (ODD) is often secured in a computer chassis via conventional means, such as screws. However, operating screws to mount such devices is time-consuming.

What is needed, therefore, is an electronic device with a mounting mechanism to overcome the limitations associated with conventional mounting means.

DETAILED DESCRIPTION

Figure 1:
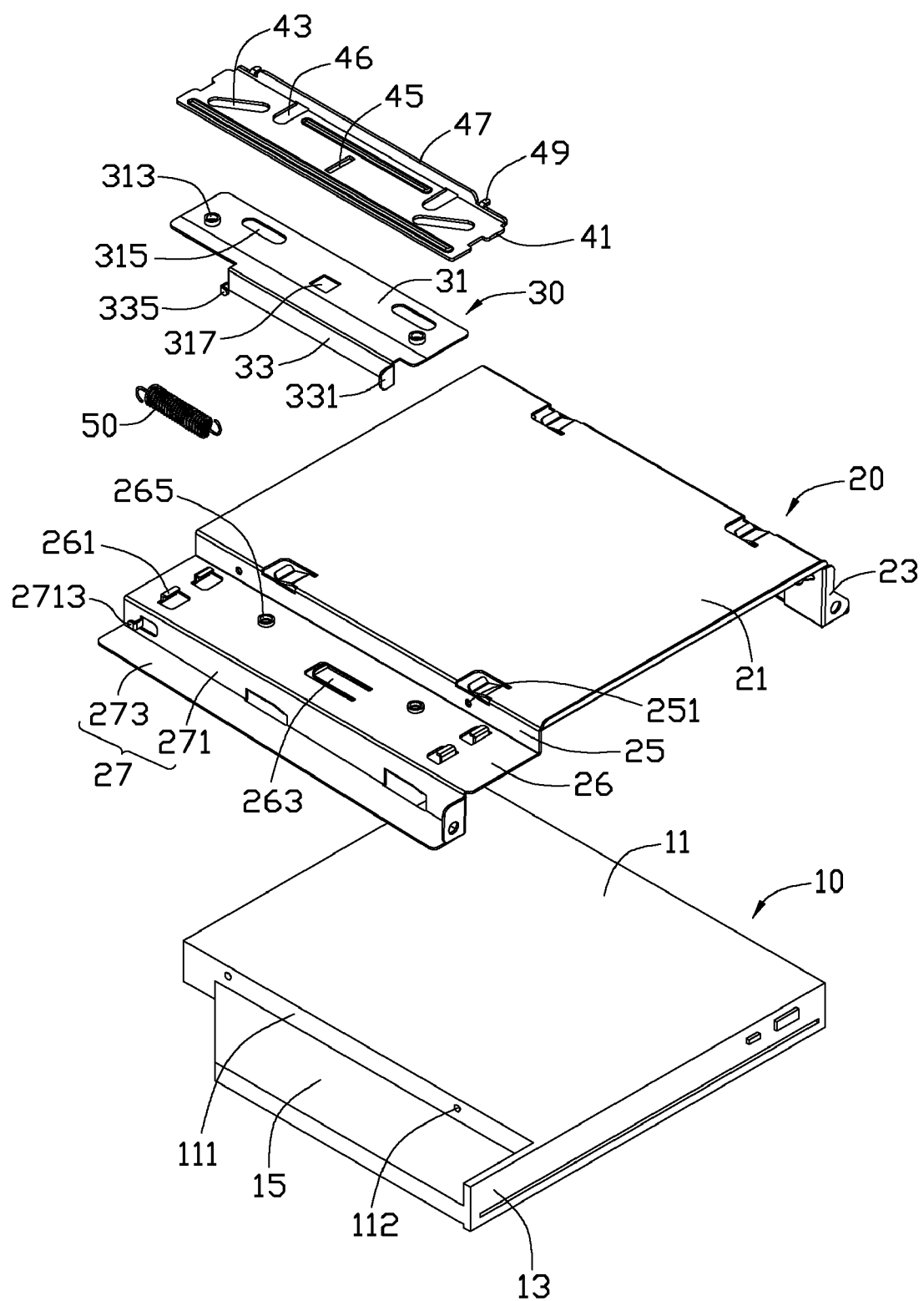
FIG. 1 is an exploded view of an electronic device in accordance with an embodiment of the present disclosure.
Figure 2:
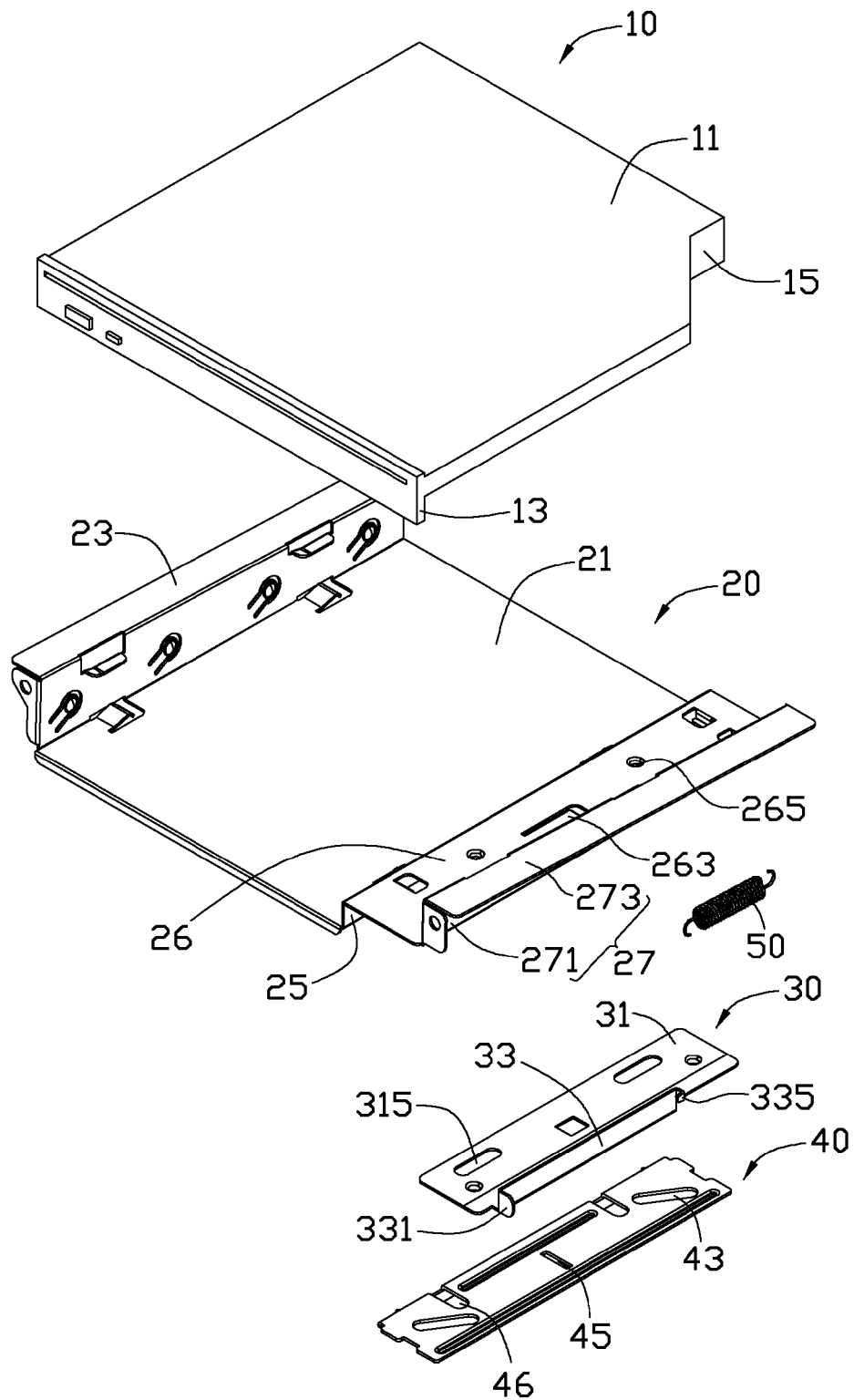
FIG. 2 is an inverted view of the electronic device of FIG. 1.

FIGS. 1-2 illustrate an electronic device in accordance with an embodiment. The electronic device includes an electronic component 10 and a mounting mechanism for fixing the electronic component 10 in a chassis (not shown) of the electronic device. In this embodiment, the electronic component 10 is an optical disk drive (ODD). The mounting mechanism includes a bracket 20, a driving member 30, a securing member 40, and an elastic member 50. (In this embodiment, the elastic member 50 is a helical spring.) The bracket 20 fixes in the chassis. The driving member 30 and the securing member 40 overlap and are mounted on the bracket 20. The helical spring 50 connects the driving member 30 and the bracket 20.

The electronic component 10 includes a rectangular main body 11, an elongated extending portion 15 and a connecting plate 13. The extending portion 15 extends outwardly from a bottom portion of a left end of the main body 11. The extending portion 15 is thinner than the main body 11. A top portion 111 of the left end of the main body 11 is bare and has two spaced holes 112 defined therein. The extending portion 15 is shorter than the main body 11 and has a pyramidal rear end. A right end of the extending portion 15 connects the main body 11, is longer than the left end and opposite to the right end. The connecting plate 13 extends outwardly from a left side of a front end of the main body 11 and connects a front end of the extending portion 15.

Figure 3:
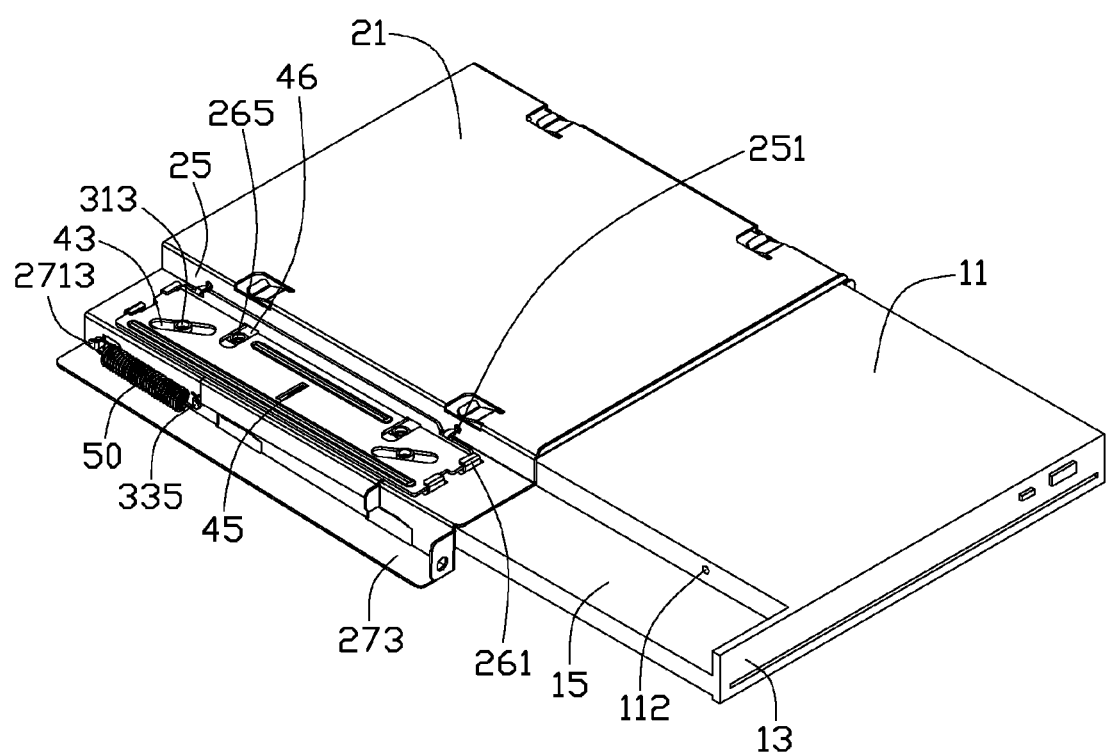
FIG. 3 is an assembled view of the electronic device of FIG. 1, but with an electronic component not yet attached.
Figure 4:
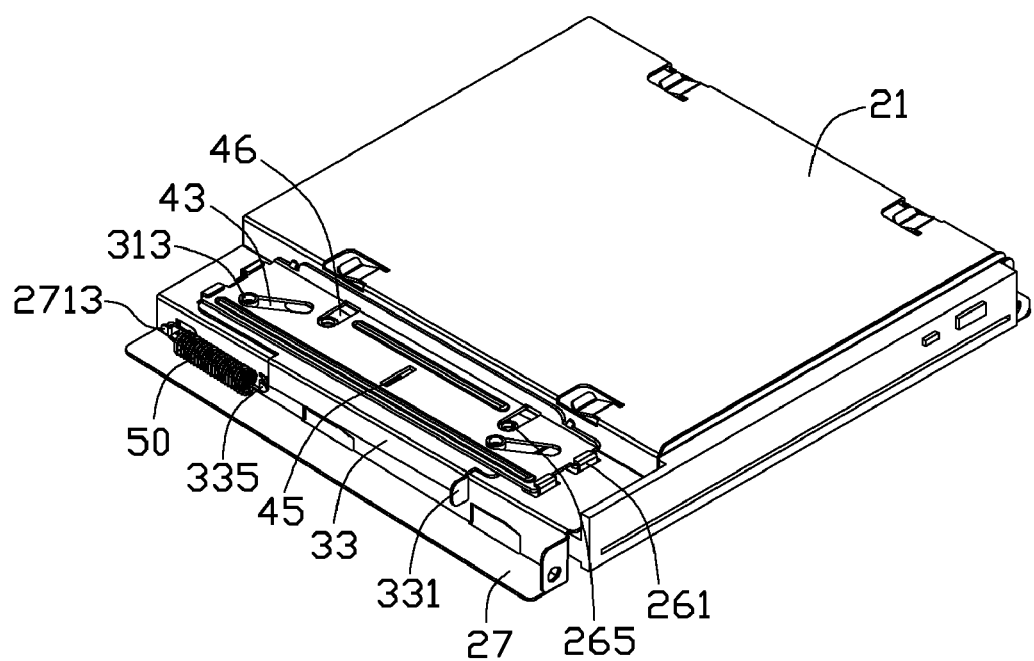
FIG. 4 is an assembled view of the electronic device, with the electronic component attached.

Referring also to FIGS. 3-4, the bracket 20 is made of elastic material and includes an elongated top plate 21, a first mounting member 23, a transition portion 25, a supporting portion 26, and a second mounting member 27. The first mounting member 23 and the transition portion 25 perpendicularly extend from opposite lateral edges of the top plate 21, respectively. The first mounting member 23 has an L-shaped configuration. The transition portion 25 is an elongated plate. The supporting portion 26 perpendicularly extends outwardly from a bottom end of the transition portion 25. The second mounting member 27 has an L-shaped configuration and perpendicularly extends from a left edge of the supporting portion 26. The bottom ends of the first mounting member 23 and the second mounting member 27 are coplanar with each other.

The top plate 21 is wider than the main body 11 of the electronic component 10. The length of the transition portion 25 is equal to that of the top plate 21, the first mounting member 23, the supporting portion 26, and the second mounting member 27, and approaches the length of the main body 11 of the electronic component 10. A width of the transition portion 25 approaches the width of the top portion 111 and of the left end of the main body 11. Two spaced mounting holes 251 define in the transition portion 25. The top plate 21, the transition portion 25, and the first mounting member 23 cooperatively form a receiving chamber (not labeled) to receive the main body 11 of the electronic component 10. The supporting portion 26 is wider than the extending portion 15 of the main body 11 of the electronic component 10.

Two pairs of bilking portions 261 are formed on front and rear ends of the supporting portion 26. The bilking portions 261 are formed by punching. The bilking portions 261, are spaced from each other and align with each other along a widthwise direction of the supporting portion 26. The bilking portion 261 is an inverted L-shaped plate. The first pair of bilking portions 261 is located at the front end and bent towards the second pair of bilking portions 261 located at the rear end. The driving member 30 and the securing member 40 insert between the two pairs of bilking portions 261. An L-shaped clasp 263 forms at a central portion of the supporting portion 26 to engage with the driving member 30. Two hollow poles 265 extend upwardly from the front and rear ends of the supporting portion 26, respectively through the driving member 30 and the securing member 40. The poles 265 insert between the two pair of bilking portions 261.

The second mounting member 27 includes an elongated first connecting plate 271 and an elongated second connecting plate 273. The first connecting plate 271 perpendicularly extends downwardly from the left edge of the supporting portion 26. An L-shaped clip 2713 forms at a rear end of the first connecting plate 271 and bends towards the rear end of the first connecting plate 271. The clip 2713 engages with the elastic member 50. The second connecting plate 273 perpendicularly extends outwardly from a bottom end of the first connecting plate 271.

The driving member 30 is a bent sheet and includes an elongated engaging portion 31 and a sidewall 33 perpendicularly extending downwardly from a left edge of the engaging portion 31. Two hollow protruding portions 313 are formed on front and rear ends of a left side of the engaging portion 31, respectively, to engage with the securing member 40. Two first grooves 315 are defined in a front and rear end of a right side of the engaging portion 31, respectively, along a lengthwise direction of the engaging portion 31. The first grooves 315 are located between the two protruding portions 313 along a widthwise direction of the engaging portion 31. The two poles 265 of the supporting portion 26 of the bracket 20 are received in the two first grooves 315 and are slidable along the first grooves 315. A rectangular through hole 317 is defined at a central portion of the engaging portion 31 to engagingly receive the clasp 263 of the supporting portion 26 of the bracket 20. The sidewall 33 is shorter than the engaging portion 31 and located at a front portion of the left side of the engaging portion 31. A rear end of the sidewall 33 forms an L-shaped clip 335 bent towards a lengthwise direction of the engaging portion 31 to engage with the elastic member 50. A front end of the sidewall 33 forms a handle 331 for effortlessly operating the driving member 30. The handle 331 is a plate.

The securing member 40 is an elongated plate, and the width of the securing member 40 borders on that of the engaging portion 31 of the driving member 30. The length of the securing member 40 is larger than that of the engaging portion 31. Two spaced protruded portions 41 are formed on a front end and a rear end of the securing member 40 to adjoin the bilking portions 261 of the supporting portion 26 of the bracket 20. Two oblique second grooves 43 are defined in opposite ends of the securing member 40 to receive the two protruding portions 313 of the engaging portion 31 of the driving member 30. The two second grooves 43 are parallel to each other. The protruding portions 313 are slidably arranged along the second grooves 43. A slit 45 is defined at a central portion of the securing member 40 along a widthwise direction of the securing member 40. When the height of the clasp 263 of the supporting portion 26 of the bracket 20 is larger than a thickness of the engaging portion 31 of the driving member 30, the clasp 263 is received in the slit 45. Thus, the clasp 263 and the securing member 40 avoid interfering with each other. Two third grooves 46 are defined at the opposite ends of the securing member 40 along a widthwise direction of the securing member 40. The third grooves 46 are between the two second grooves 43. The poles 265 of the supporting portion 26 of the bracket 20 extend through the two third grooves 46. A baffling plate 47 extends upwardly from a central portion of a right edge of the securing member 40 to adjoin the transition portion 25 of the bracket 20. Two blocking portions 49 are formed on opposite ends of the baffling plate 47 by pinching, and extend through the mounting holes 251 of the transition portion 25 and engage in the holes 112 of the main body 11 of the electronic component 10.

Referring also to FIG. 4, when the electronic device is assembled, the electronic component 10 is received in the bracket 20. For assembly, firstly, the electronic component 10 is partly inserted in the receiving chamber of the bracket 20 formed by the top plate 11, transition portion 25, and the first mounting member 23 of the bracket 20. Part of the extending portion 15 of the electronic component 10 is covered by part of the supporting portion 26 and the second mounting member 27 of the bracket 20. The second mounting member 27 is located at an outside of the extending portion 15. The driving member 30 is arranged on a top side of the supporting portion 26 and located between the bilking portions 261 of the supporting portion 26. The sidewall 33 is located at an outside of the first connecting plate 271 of the second mounting member 27 and adjoins the first connecting plate 271. In this state, the clip 335 of the sidewall 33 of the driving member 30 is near to the clip 2713 of the first connecting plate 271 of the second mounting member 27. The clip 335 and the clip 2713 are oriented toward opposite directions. The poles 265 extend through the first grooves 315 of the engaging portion 31 of the driving member 30. The clasp 263 of the supporting portion 26 extends through the through hole 317 of the engaging portion 31.

The securing member 40 adjoins a top surface of the engaging portion 31 of the driving member 30 and is located between the bilking portions 261 of the supporting portion 26. The baffling plate 47 faces the transition portions 25. The protruding portions 313 of the engaging portion 31 extend through the second grooves 43 of the securing member 40. The poles 265 of the supporting portion 26 extend through the third grooves 46 of the securing member 40. The clasp 263 extends through the slit 45 of the securing member 40. Opposite ends of the elastic member 50 clasp the clip 335 of the sidewall 33 and the clip 2713 of the first connecting plate 271.

The electronic component 10 is pushed to make the electronic component 10 move along the bracket 20 until the front end of the supporting portion 26 abuts against the connecting plate 13 of the electronic component 10. The handle 331 of the sidewall 33 of the driving member 30 is pulled to make the driving member 30 move along a lengthwise direction of the supporting portion 26. The protruding portions 313 of the engaging portion 31 of the driving member 30 move along the second grooves 43 of the securing member 40, to drive the securing member 40. The securing member 40 thus moves along the lengthwise direction of the supporting portion 26, and towards the top portion 111 of the left end of the main body 11 until the blocking portions 49 extend through the mounting holes 251 of the transition portion 25 and engage in the holes 112 of the main body 11 of the electronic component 10. Thus, the electronic device is assembled completely. In this process, the poles 265 of the supporting portion 26 of the bracket 20 limit movement of the driving member 30 along directions of the first grooves 315. The poles 265 also limit movement of the securing member 40 along directions of the third grooves 46. The helical spring 50 is stretched.

When the electronic device is disassembled, the handle 331 of the sidewall 33 of the driving member 30 is drawn outwardly to make the blocking portions 49 come out from the mounting holes 251 of the transition portions 25 and the holes 112 of the main body 11 of the electronic component 10. Thus, processes of assembly or disassemblies of the electronic component 10 are easier and timesaving.

It is to be understood, however, that even though numerous characteristics and advantages of the embodiments have been set forth in the foregoing description, together with details of the structures and functions of the embodiments. The disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An electronic device comprising:
   an electronic component;
   a bracket accommodating the electronic component;
   a driving member mounted on the bracket; and
   a securing member mounted on the bracket;
   wherein the driving member is operated along a first direction to force the securing member to move along a second direction to engage with the bracket and the electronic component to assemble the bracket and the electronic component together;
   wherein the driving member comprises an engaging portion sandwiched between the bracket and the securing member, a protruding portion extends upwardly from the engaging portion through a slantwise first groove defined in the securing member, and the protruding portion is slidable along the first groove to make the securing member move along the second direction.

2. The electronic device of claim 1, wherein the engaging portion defines a second groove along the first direction, the securing member defines a third groove along the second direction, and a pole extends upwardly from the bracket through the second groove and the third groove.

3. The electronic device of claim 2, further comprising an elastic member connecting the bracket and the driving member.

4. The electronic device of claim 3, wherein the driving member further comprises a sidewall extending downwardly from a lateral edge of the engaging portion, a clip and a handle formed on opposite ends of the sidewall, and another clip formed on the bracket; and opposite ends of the elastic member engage with the clips of the sidewall and the bracket.

5. The electronic device of claim 4, wherein a clasp is formed on the bracket and extends through the engaging portion of the driving member and the securing member.

6. The electronic device of claim 1, wherein two bilking portions are formed on the bracket and sandwich the driving member and the securing member therebetween.

7. The electronic device of claim 6, wherein each of the bilking portions has an inverted L-shaped configuration and the bilking portions bend toward each other.

8. The electronic device of claim 1, wherein a blocking portion is formed on the securing member, a hole is defined in the electronic component, and the blocking portion extends through the bracket to engage in the hole of the electronic component.

9. The electronic device of claim 8, wherein the bracket comprises a transition portion adjoining a lateral end of the electronic component and a supporting portion extending outwardly from the transition portion, the securing member and the driving member are mounted on the supporting portion, and the blocking portion of the securing member extends through the transition portion and engages in the hole of the electronic component.

10. An electronic device comprising:
an electronic component;
a bracket enclosing the electronic component, the bracket comprising a transition portion adjoining the electronic component and a supporting portion extending outwardly from the transition portion;
a driving member mounted on the supporting portion of the bracket; and
a securing member mounted on the supporting portion of the bracket and comprising a blocking portion;
wherein the driving member is operated along a first direction to drive the securing member to move along a second direction perpendicular to the first direction such that the blocking portion of the securing member engages with the transition portion and the electronic component to assemble the bracket and the electronic component together; and
wherein the driving member comprises an engaging portion sandwiched between the supporting portion and the securing member, a protruding portion extends upwardly from the engaging portion and extends through a slantwise first groove defined in the securing member, and the protruding portion is slidable along the first groove to make the securing member move along the second direction.

11. The electronic device of claim 10, wherein the engaging portion defines a second groove along the first direction, the securing member defines a third groove along the second direction, and a pole extends upwardly from the supporting portion and extends through the second groove and the third groove.

12. The electronic device of claim 10, wherein two bilking portions are formed on the supporting portion and sandwich the driving member and the securing member therebetween.

13. The electronic device of claim 10, wherein a first connecting plate extends downwardly from the supporting portion, a clip is formed on the first connecting plate, another clip is formed on the driving member, and opposite ends of an elastic member engage with the two clips.

14. The electronic device of claim 10, wherein the bracket further comprises a top plate extending outwardly from the transition portion, and a first mounting member extending downwardly from the top plate, the top plate, the transition portion and the first mounting member cooperatively form a receiving chamber to receive a main body of the electronic component therein, and the blocking portion extends through the transition portion and engages in a hole defined in the main body.

15. The electronic device of claim 14, wherein the main body comprises an extending portion extending outwardly from a bottom portion of a lateral side of the main body, and the supporting portion adjoins a top side of the extending portion.

16. The electronic device of claim 15, wherein the extending portion is thinner than the main body, the transition portion of the bracket adjoins a top portion of the lateral side of the main body, and the blocking portion of the securing member extends through the transition portion and engages in a through hole defined in the top portion of the lateral side of the main body.

17. The electronic device of claim 15, wherein a connecting plate extends from the main body and connects the extending portion of the electronic component, and the connecting plate adjoins the supporting portion.

18. An electronic device comprising:
an electronic component;
a bracket enclosing the electronic component, the bracket comprising a transition portion adjoining the electronic component and a supporting portion extending outwardly from the transition portion, a first connecting plate extending downwardly from the supporting portion, and a clip being formed on the first connecting plate;
a driving member mounted on the supporting portion of the bracket, another clip being formed on the driving member;
an elastic member, opposite ends of the elastic member engaged with the two clips; and
a securing member mounted on the supporting portion of the bracket and comprising a blocking portion;
wherein the driving member is operated along a first direction to drive the securing member to move along a second direction different from the first direction such that the blocking portion of the securing member engages with the transition portion and the electronic component to assemble the bracket and the electronic component together.

19. The electronic device of claim 18, wherein the bracket further comprises a top plate extending outwardly from the transition portion, and a first mounting member extending downwardly from the top plate, the top plate, the transition portion and the first mounting member cooperatively form a receiving chamber to receive a main body of the electronic component therein, and the blocking portion extends through the transition portion and engages in a hole defined in the main body.

20. The electronic device of claim 19, wherein the main body comprises an extending portion extending outwardly from a bottom portion of a lateral side of the main body, and the supporting portion adjoins a top side of the extending portion.

* * * * *